Nov. 10, 1970  E. M. HORNOR ET AL  3,538,697
METHOD OF AND APPARATUS FOR MANUFACTURING
IMPROVED HIGH-FREQUENCY CABLES
Filed Aug. 30, 1968  7 Sheets-Sheet 1

INVENTORS
E. M. HORNOR
W. H. HYDE
BY P. J. Tairulali jr.
ATTORNEY

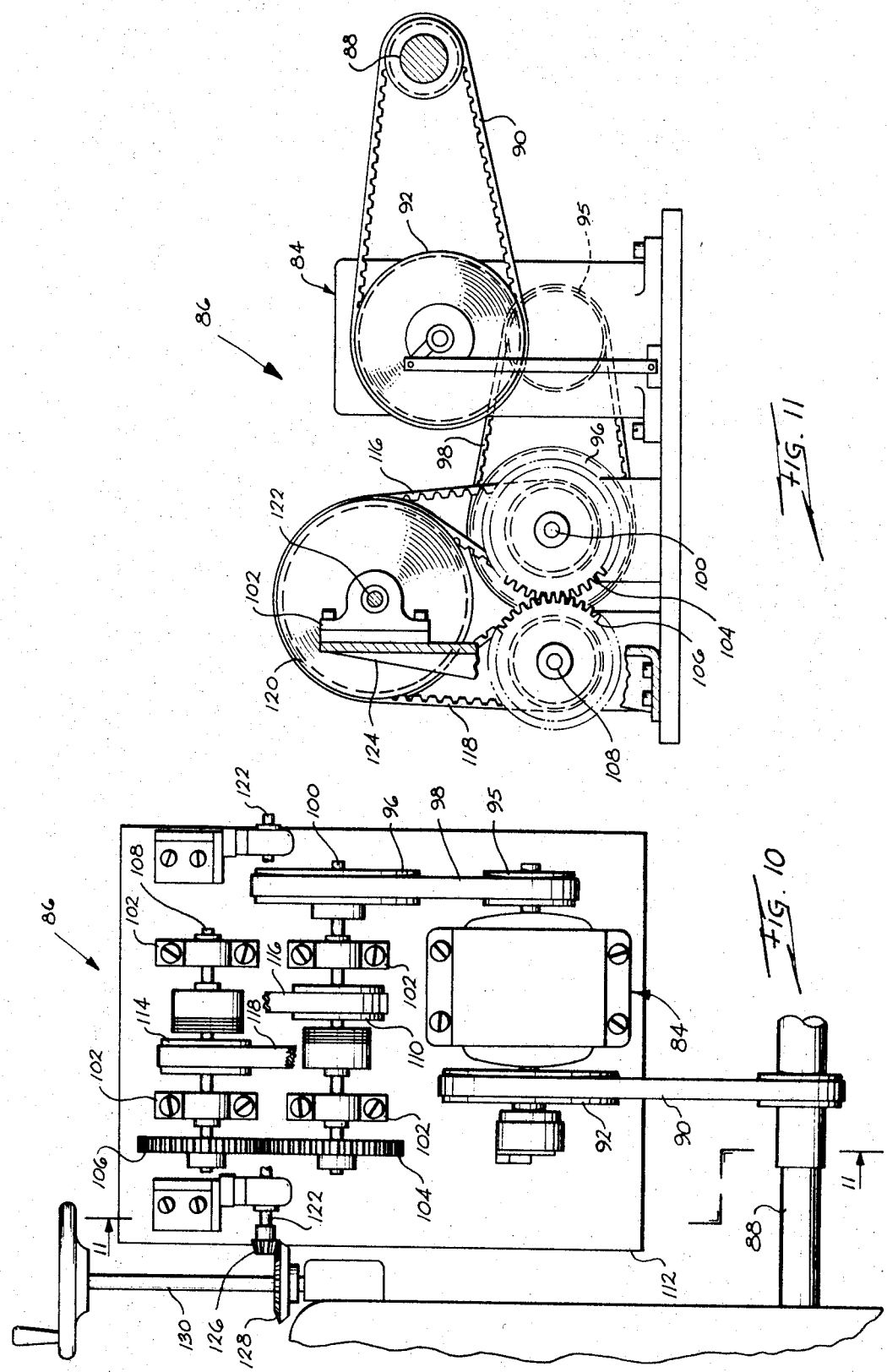

United States Patent Office 3,538,697
Patented Nov. 10, 1970

3,538,697
METHODS OF AND APPARATUS FOR MANUFACTURING IMPROVED HIGH-FREQUENCY CABLES
Eugene M. Hornor, Rosedale, and William J. Hyde, Baltimore, Md., assignors to Western Electric Company, Incorporated, New York, N.Y., a corporation of New York
Filed Aug. 30, 1968, Ser. No. 756,541
Int. Cl. B65h 81/00
U.S. Cl. 57—6      28 Claims

ABSTRACT OF THE DISCLOSURE

Methods and apparatus for producing cables are provided in which components of the cable having high-frequency conductors, such as coaxial units or waveguides, are combined with each other or other elements of the cable in a spiral configuration wherein the pitch of the spiral configuration is varied throughout the length of the cable. The variation of pitch of the spiral reduces the potential for the development of regularly spaced impedance discontinuities which can cause high reflection losses of energy in the coaxial or waveguide-type components in situations where the cable has been slid or rolled across a rigid surface. Undesirable secondary effects associated with a periodicity of variation in the spiral configuration can be reduced by employing a sinusoidal pattern in varying the pitch of the component in the cable.

BACKGROUND OF THE INVENTION

Field of the invention

The invention relates to methods and apparatus for producing cables wherein regularly spaced impedance discontinuities are reduced in a range of intervals of length which correspond to one-half-wave lengths of a desired bandwidth of operation by varying a pattern in which components are spirally combined into the cable.

Description of the prior art

If a coaxial line is not uniform in impedance throughout its length, and particularly if changes in impedance occur abruptly, a portion of a transmitted signal will be reflected at the point of impedance discontinuity and returned to a transmitter. The magnitude of this reflected wave (usually called an echo or reflection) is proportional to the magnitude of the impedance discontinuity at the reflection point.

Return loss is perhaps a more meaningful term for expressing the magnitude of a reflection. It is defined as the loss that the reflected portion of the incident signal experiences in being reflected, expressed in decibels (db).

Since reflections are caused by an impedance discontinuity in a coaxial structure, any abrupt change in either the physical or electrical characteristics of the coaxial may produce a reflection. Dimensional change, change in dielectric material, and short increments of resistance, capacitance or inductance, for example, may produce reflections. Those reflections which arise from some structural change in a transmission line can be referred to as structural return loss, or SRL, for simplicity.

A multiplicity of reflection points may exist on a transmission line. The most typical of this latter type is a more or less random distribution of very small reflections occurring throughout the length of the line. These assorted reflected waves travel back to the transmitting end and form a vector sum at that point. Since the reflected waves arrive with random phase angles, the probabilities are that just as many reflected waves arrive with random negative phase angles as with positive. Thus, the vector sum is a random function of frequency. The effect on the transmission of information is negligible.

It is conceivable that a series of evenly spaced discontinuities may occur on a transmission line. This would occur if there were some periodic effect in the manufacturing process of the transmission line or some inherent periodicity in the structure of the transmission line.

For such evenly spaced discontinuities, there would be a fundamental frequency for which the inter-discontinuity spacing would be just one-half-wave length. At this frequency, the reflection from each discontinuity would add in phase at the transmitting end and would combine with the transmitted signal to produce a substantial impedance change from the desired impedance.

Whereas a single discontinuity, though large, may have little effect on transmission, the impedance change due to multiple discontinuities is a direct function of length. Each reflection contributes to the total, so the longer the line, the more contributions, therefore the greater the total return.

The effect of impedance discontinuities on the transmission of a signal down a transmission line is twofold in nature. Delay distortion, one effect, is caused by double reflection of the transmitted signal such that a reflected portion of the original wave arrives at the receiver delayed in time from its parent wave. On telephone lines, this distortion is manifested as an annoying echo to the telephone users. On a television screen, it is seen as the well-known "ghost," a second and fainter image of the transmitted picture appearing to the right of the original.

Gain distortion, the second effect, is caused by a frequency-dependent change in input impedance as the transmitted wave and reflected wave combine at the transmitter. Since a load which varies with frequency is being presented to the transmitter, varying power will be sent down the line, and so received at the far end.

In non-regenerative repeatered communication systems, the transmission degradation in each repeater section (caused by impedance discontinuities) is preserved in subsequent sections and is so received at the termination of the line. Thus, this degradation is cumulative, with each section adding its inherent contribution. It can be seen that the minimization of this degradation is vitally important to ensure a high quality transmission facility.

When the distance between impedance variations becomes a half-wave length of any of the signal frequencies, the small reflections add together in phase and produce a large total reflection at that particular frequency.

There has been recognition, in the past, that the structural characteristics of individual transmission lines such as a coaxial unit or a tubular waveguide should be controlled from both a manufacturing and design point of view in order that repetitive spacing of impedance discontinuities did not occur in patterns which would adversely affect transmission of signals in the desired bandwidth of the individual transmission line. There has not been, however, a recognition that when a plurality of the individual transmission lines are combined together in a cable or when other types of transmission components are combined with the coaxial or waveguide-type transmission lines in a cable that there is created, in the combination, a potential for producing regularly spaced discontinuities within the coaxial or waveguide-type transmission lines. This potential is created because repetitive deformation can occur which deformation can act as impedance discontinuities to distort a desired signal. Nor was it recognized that novel cable-stranding techniques could be employed to reduce the potential for the development of regularly spaced impedance discontinuities in the transmission components.

SUMMARY OF THE INVENTION

It is an object of the invention to provide new and improved methods of and apparatus for producing cables in which the effect of impedance discontinuities introduced by any periodicity associated with a pattern of combination of components of the cables is substantially reduced.

It is another object of the invention to provide new and improved methods of and apparatus for stranding the cables in a manner which reduces a potential for the development of regularly spaced impedance discontinuities in the transmission components thereof.

It is still another object of the invention to provide methods of and apparatus for stranding components of a cable having members with tubular conductors into a spiral configuration wherein the pitch of the spiral configuration is varied throughout the length of the cable.

It is a further object of the invention to provide methods of and apparatus for producing cables in which components of a cable, having members with tubular conductors, are stranded together into a spiral arrangement wherein the pitch of the spiral arrangement is varied according to a predetermined program throughout the length of the cable.

A method for making cable embodying certain features of the invention may include the steps of combining a plurality of elongated elements, at least one of which is conductive, with each other in a pattern and varying the pattern along the length of the cable to reduce the number of occurrences of impedances discontinuities which fall in at least one group of discontinuities having intervals of length between successive discontinuities thereof which correspond to a half-wave length of a frequency which has its fundamental or harmonics in the desired bandwidth of the conductive elements so that in-phase addition of reflections of energy associated with said ground of discontinuities is reduced and any degradation of a transmitted signal caused by said group of discontinuities is decreased.

Apparatus for making a cable embodying certain features of the invention may include means for combining a plurality of elongated elements, at least one of which is conductive, with each other in a pattern and means for varying the pattern along the length of the cable to reduce the number of occurrences of impedance discontinuities which fall in at least one group of discontinuities having intervals of length between successive discontinuities thereof which correspond to a half-wave length of a frequency which has its fundamental or harmonics in the desired bandwith of the conductive elements so that in-phase addition of reflections of energy associated with said group of discontinuities is reduced and any degradation of a transmitted signal caused by said group of discontinuities is decreased.

BRIEF DESCRIPTION OF THE DRAWINGS

Other objects and features of the present invention will be more readily understood from the following detailed description of specified embodiments thereof when read in conjunction with accompanying drawings in which:

FIG. 10 is a plan view of the lay variator portion of the system illustrated in FIG. 9 having various portions removed therefrom for purposes of clarity.

FIG. 11 is an elevational side view of the mechanism illustrated in FIG. 10 taken along the lines 11—11 thereof.

DETAILED DESCRIPTION

Figure 1:
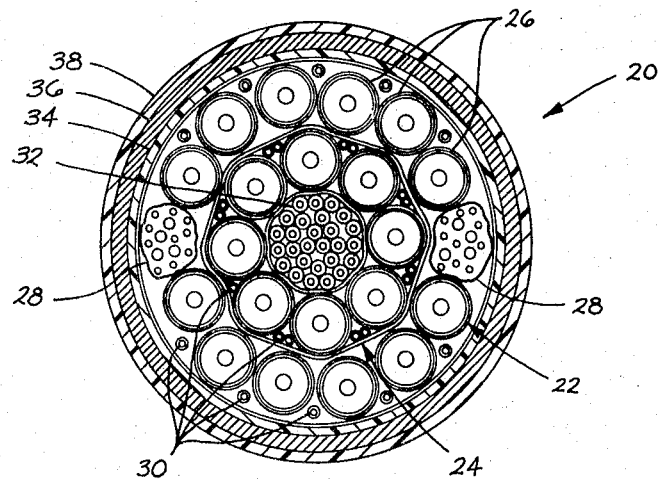
FIG. 1 is a cross-sectional view of an embodiment of a cable produced by methods or apparatus embodying certain principles of the present invention.

Referring now to FIG. 1, there is illustrated a coaxial cable, designated generally by the numeral 20, which includes an outer layer, designated generally by the numeral 22 of conductors and an inner layer, designated generally by the numeral 24. The outer layer 22 includes a plurality of coaxial cable units, designated generally by the numerals 26—26. There are twelve of the coaxial units 26—26 included in the outer layer 22. The inner layer 24 includes eight of the coaxial units 26—26. The number of the coaxial units in each of the layers is not critical to the invention; the particular configuration shown in FIG. 1 simply being illustrative of a working embodiment of the invention.

Also included within the outer layer 22 are two stranded conductor units 28—28 and a plurality of interstitial conductors 30—30. Some conductors similar to the interstitial conductors 30—30 are also included within the inner layer 24. A center core 32 of stranded conductors is situated inwardly in the inner layer 24.

Surrounding the outside of the cable 20 is an extruded plastic dielectric jacket 34, preferably of a material such as low-density, high-molecular-weight polyethylene. Extruded over the dielectric jacket 34 is a lead sheath 36, preferably of an alloy made up of 1% antimony and the remainder lead. Covering the lead sheath 36 is a plastic abrasion-resistnt jacket 38, preferbly of high-molecular-weight, low-density polyethylene with a high carbon black content for an increased resistance to ultraviolet ray damage.

Figure 2:
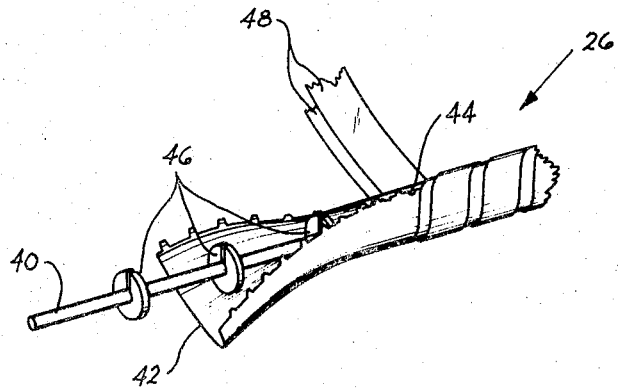
FIG. 2 is a perspective exploded view of a coaxial unit which forms a component of the cable of FIG. 1.

An enlarged, detailed view of one of the coaxial units 26—26 is shown in FIG. 2. Each of the coaxial units 26—26 includes an inner conductor 40, preferably of a copper wire having a diameter of 0.1 inch and an outer conductor 42 formed into a tube shape, preferably from a tape of copper 1.31 inches wide and 0.012 inch thick which is positioned concentrically about the inner conductor. The outer conductor 42 is closed with a serrated seam 44. The inner conductor 40 is supported in the desired location within the outer conductor 42 with disc insulators 46—46, preferably punched from high-molecular-weight, low-density polyethylene tape 0.085 inch thick.

Surrounding the outer conductor 42 are two steel tapes 48—48 which are applied helically with a left-hand wrap in overlapping relationship with each other. The steel tapes 48—48 are preferably low-carbon steel 0.006 inch thick and 0.3125 inch wide. A coaxial unit of the type described here is disclosed in U.S. Pat. 2,471,299 issued to E. Bertalan et al. on May 24, 1949.

Figure 3:
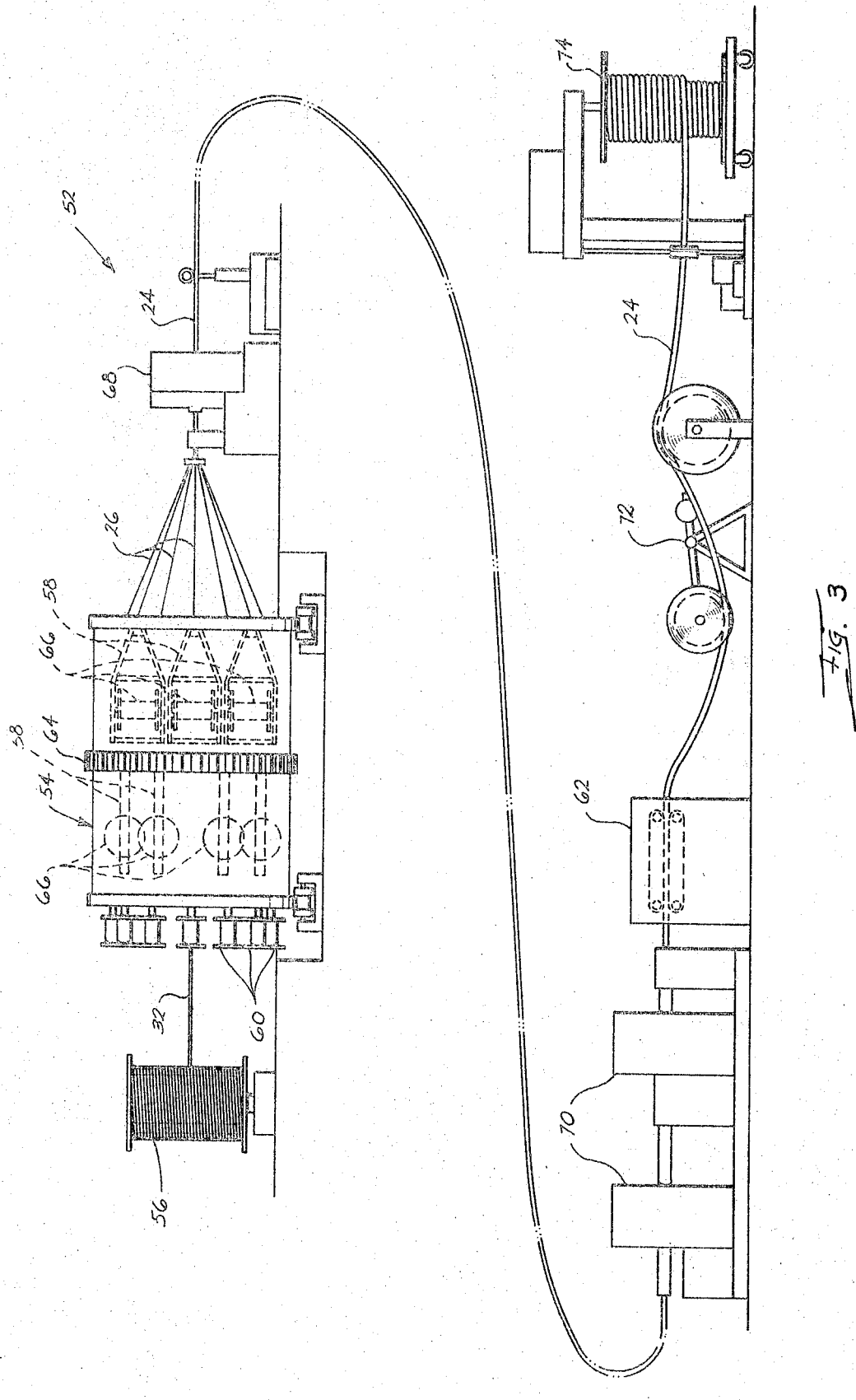
FIG. 3 is a simplified elevational view of an inventive stranding apparatus.

Referring now to FIGS. 1 and 3, a stranding machine, designated generally by the numeral 52, is shown on which the outer layer 22 and the inner layer 24 can be stranded over the core 32. During the stranding of the inner layer 24 over the core 32, the core is paid into a strander drum, designated generally by the numeral 54, from a coretruck or supply stand 56. The strander drum 54 is equipped with twelve planetary yokes 58—58 and a plurality of fixed carriage reel supports 60—60.

A capstan 62 provides the necessary motive force for pulling the core 32 and the coaxial units 26—26 as well as the interstitial conductors 30—30 through the stranding machine 52. As the core 32 and the components of the inner layer 24 are pulled through the stranding machine 52, the strander drum 54 is driven about it own axis through a drive gear 64. Reels in each of the fixed reel carriage positions 60—60 pay out the interstitial conductors 30—30 at the required rate with the desired tension therein. Reels 66—66 having the coaxial units 26—26 thereon are carried around the core 32 within the planetary yokes 58—58. As the reels 66—66 are carried around the core 32, the coaxial units 26—26 of the inner layer 24 are paid off the reels at the required rate and with the required tension.

The planetary yokes 58—58 are each rotated about their own axes as they are revolved about the core 32 during the rotation of the strander drum 54. Planetary gearing (not shown) is provided so that each of the planetary yokes 58—58 rotates slightly more than one entire revolution with respect to the strander drum 54 during one revolution of the strander drum. The portion of the revolution of each of the planetary yokes 58—58 which succeeds one complete revolution manifests itself in a tightening of the helical steel tapes 48—48 which are wrapped about the outer conductor 42 of each of the coaxial units 26—26 in the manner described in U.S. Pat. 2,182,330, issued to A.S. Windeler on Dec. 5, 1939. The portion of the revolution of the planetary yokes 58—58 which tightens the tapes 48—48 is commonly known in the planetary stranding field as "backtwist." Revolution of the strander drum 54 about the core 32 causes the coaxial units 26—26 and the interstitial conductors 30—30 to be stranded on the core with a spiral pattern. The length of the core 32 which moves linearly through the stranding machine 52 during one revolution of the strander drum 54 is known in the stranding industry as the length of "lay" or "lay length." The "lay length" imparted to the inner layer 24 is 20 inches, and the backtwist imparted to each of the coaxial units 26—26 within the layer is 37.5°. In the particular embodiment being discussed, no attempt is made to control backtwist or apply planetary stranding action on any of the interstitial conductors 30—30.

After the core 32 and the components of the inner layer 24 emerge from the strander drum 54, they are bound together with a strand material by the use of a binding head 68. After passing through the binding head 68, the core 32 and inner layer 24 progress to one of two paper-taping heads 70—70, which head applies a paper tape helically over the outside of the inner layer in an overlapped relationship. The wrapped core 32 and inner layer 24 progress through a tension-control device 72 and are finally wound onto a take-up reel 74.

In order to place the outer layer 22 into the cable 20, the combined core 32 and inner layer 24 are placed in the supply stand 56; and the combined core and inner layer are passed through the stranding machine 52 in a manner similar to that in which the core was passed through the stranding machine. The stranded units 28—28 are supplied from the fixed reel carriages 60—60, and the coaxial units 26—26 of the outer layer 22 are supplied from the planetary yokes 58—58. The binding head 68 is used to apply a strand binding of the outer layer 22, and the paper-taping head 70 is used to wrap paper tape helically over the outside of the outer layer. The combined core 32, inner layer 24 and outer layer 22 are wound onto the take-up reel 74. The coaxial units 26—26 of the outer layer 22 are applied with a 36-inch average lay and with a 37.5° backtwist.

It is of some consequence in the design of cables like the cable 20 to have the lengths of the coaxial units 26—26 in the inner layer 24 equal to the lengths of the coaxial units in the outer layer 22 so that pairing of the coaxial units can be accomplished between coaxial units in the inner layer and coaxial units in the outer layer without experiencing problems associated with unequal transmission delay caused by unequal lengths of the coaxial units. The coaxial units 26—26 within the inner layer 24 are stranded into the layer with a mean circumference of 3.46 inches and a lay of 20 inches. The coaxial units 26—26 of the outer layer 22 are stranded with a mean circumference of 6.22 inches and a lay of 36 inches. The particular set of mean circumferences and lay lengths of the coaxial units 26—26 in the inner and outed layers 24 and 22 are such that the length of the coaxial units are substantially all the same.

Figure 4:
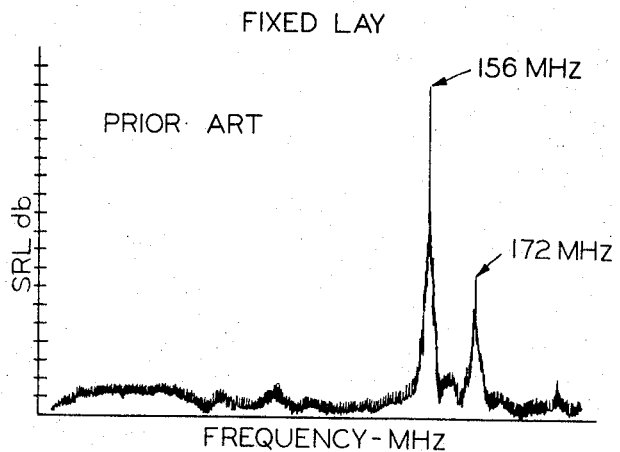
FIG. 4 is a graphical representation of a relationship between structural return loss in decibels versus frequency of transmission in megaHertz as it existed in prior art cables.

Referring now to FIG. 4, there is a graphical representation of the relationship between structural return loss of a function of the frequency of a transmitted signal within one of the coaxial units 26—26. The graphical representation of FIG. 4 is typical of one of the coaxial units 26—26 of the outer layer 22 where a fixed lay length of 36 inches was used in stranding the outer layer. A large spike, representing a high loss, develops at approximately 155 to 157 mHz. A frequency of 157 mHz. has an associated half-wave length of approximately 36 inches, and the fact that a severe loss develops at that frequency suggests that some repetitive discontinuity of impedance within the coaxial unit 26 is developing at 36-inch intervals.

A particular group of impedance discontinuities may have harmonics associated with itself, which harmonics may manifest themselves as in-phase additive disturbances to frequencies which are harmonics of the fundamental frequencies which are affected by the fundamental repetitive impedance discontinuities.

If the cable 20 is allowed to slide or roll over a rigid surface, then each of the coaxial units 26—26 within the outer layer 22 will contact the rigid surface at 36 inch intervals because the coaxial units are stranded with a 36 inch lay. The contact causes deformation of the outer conductors 42—42 which in turn results in impedance discontinuities. Such a contacting of rigid surface by the coaxial units 26—26 is virtually inevitable because the cable 20 is allowed to pass over the tension-control device 72 and various elements of the stranding machine 52 as it is wound onto the takeup reel 74. Contacting of rigid surface by the coaxial unit 26 in the outer layer 22 also develops when the combined core 32, inner layer 24 and outer layer have the dielectric jacket 34 placed thereover in an extrusion operation (not shown). Similar potentials for contact exist when the lead sheath 36 and the abrasion-resistant jacket 38 are applied to the cable 20.

Figure 6:
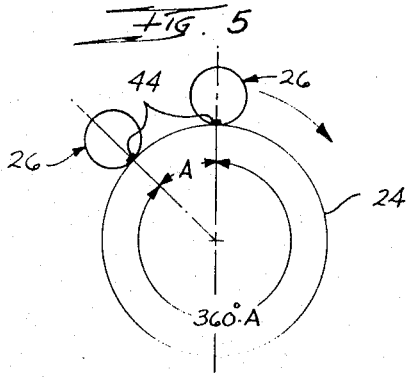
FIG. 6 is a schematic illustration of the relationship which exists between a coaxial unit and a portion of the cable which underlies the coaxial unit before and after a part of a revolution of the coaxial unit about its own axis which occurs during stranding. The figure shows the amount of revolution of the coaxial unit which takes place to bring a seam into engagement again with the underlying portion of the cable.

FIG. 6 is a graphical representation of the relationship of the serrated seam 44 with respect to the underlying portion of the cable 20 during the course of one revolution of the strander drum 54. It can be seen that, at an angle of 360° minus A, the seam 44 assumes the same relationship to the underlying portion of the cable 20 as that which existed at the starting point of the revolution in the graphical representation of FIG. 6. In the particular example of the backtwist being 37.5° and the mean circumference about which the coaxial unit 26 is stranded being 6.22 inches, the angle A becomes 34°; and the associated periodicity of the interaction phenomenon becomes 32.5 inches with an associated transmission loss developing at 172 to 173 mHz.

The graphical representation of FIG. 4 shows a rather large loss developing at 172 to 173 mHz. The half-wave length corresponding to 172 to 173 mHz. is approximately 32.5 inches. Thirty-two and one-half inches is the length of one of the coaxial units 26—26 between a point on the cable 20 where the serrated seam 44 is directly adjacent to the underlying portion of the cable shown graphically in FIG. 6 and a corresponding point in the same coaxial unit where the serrated seam is again directly adjacent to the underlying portion of the cable. A periodic contacting of the serrated seam 44 with the underlying portion of the cable 20 will tend to introduce a periodic change in impedance of the coaxial unit 26. It is thought that the periodic impedance change associated with the interaction of the seam 44 and the underlying portion of the cable 20 is manifested in the large structural return loss at a frequently of 172 mHz.

Figure 5:
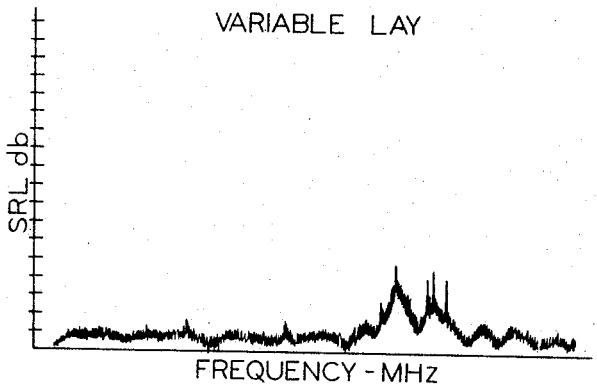
FIG. 5 is a graphical representation of the relationship between the same parameters shown in FIG. 4 but is illustrative of the characteristics of a cable produced by methods or apparatus embodying certain principles of the present invention.

FIG. 5 is a graphical representation of structural return loss as a function of a frequency being transmitted through one of the coaxial units 26—26. The coaxial unit 26 which is represented in FIG. 5 has been stranded as a component of an outer layer 22 with a variable lay having an average lay length of 36 inches. The lay length of the coaxial unit 26 represented in FIG. 5 was varied continuously between some lay length less than 36 inches and some lay length greater than 36 inches. As one can readily see, the sharp loss associated with frequency of 157 mHz. and 172 to 173 mHz. no longer exists, but rather a general smearing of losses within the broad range of frequencies has occurred. The periodicity associated with a 36 inch lay length and its related impedance changes and the periodicity associated with a 37.5° backtwist used with the 36 inch lay length are no longer evident as sharp losses because the effect of the periodicities have been greatly reduced. For example, if the lay of the outer unit 22 is allowed to vary linearly from 32 inches to 40 inches and back again from 40 inches to 32 inches during the stranding of one length of cable of say, 1000 feet; then, a lay of 36 inches would exist within each of the coaxial units 26—26 only two times within that particular length of 1000 feet of the cable 20. Thus, an impedance change associated with a frequency, having a wave length of 36 inches, would develop only twice within that 1000 feet long length of the cable 20; and these changes might very well be out of phase with each other. Similarly, an impedance change having an associated frequency with a half-wave length of 37 inches would also develop twice within that same 1000 foot length of the cable 20 and so on. This should be contrasted to the case illustrated in FIG. 4 where a 1000 foot length of the cable 20 could have an impedance variation associated with a frequency having a wave length of 36 inches occurring over 300 times, and the discontinuities are in phase with each other.

Extending the above comparison even further, it might appear that the optimum pattern for variation of lay length in any particular cable would consist of varying the lay length continuously from one end of a length of the cable 20 to the other without changing the direction of variation. If this were the practice, a lay length of 36 inches, for example, would only occur once within a length of the cable 20.

However, because of manufacturing convenience, the cable 20 is made in various lengths; in other words, not all lengths which are made within the stranding machine 52 are 1000 feet. The program by which lengths of the cable 20 are varied is substantially random in nature. In other words, during the course of any one day of operation, lengths of the cable 20 of 1000 feet, 500 feet, 1700 feet and 1100 feet may follow one another through the stranding machine 52.

It becomes somewhat inconvenient to continually change the characteristics of the components of the stranding machine 52 which accomplish the variation in lay to have these components provide an average lay length of 36 inches in each of the many different lengths of cable which may go through the stranding machine in any one day. The characteristics of the machine 52 could be made to change automatically, but this would involve rather complex programming mechanisms. In order to strike an appropriate balance between convenience of operation of the stranding machine 52 and decrease of the structural return loss within the coaxial units 26—26, a repetitive pattern of lay variation has been chosen as the technique by which the stranding machine will be operated.

Figure 7:
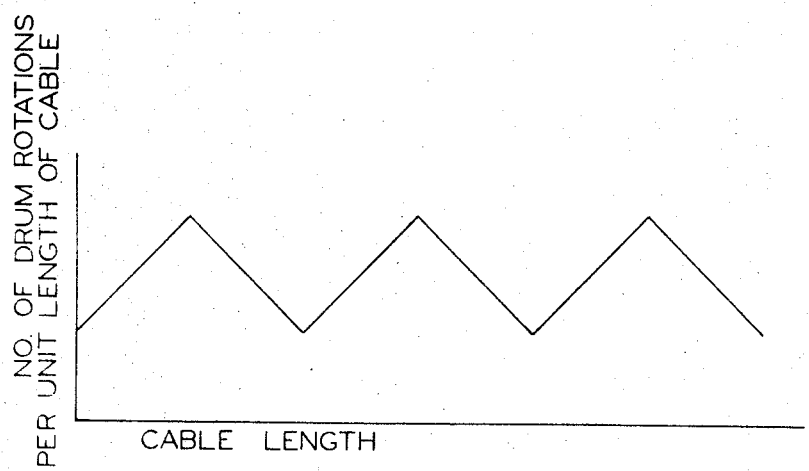
FIG. 7 is a graphical representation illustrating the relationship between the number of drum rotations per unit length of cable versus the cable length produced by one particular embodiment of the invention.

The pattern of operation of the stranding machine 52 is illustrated graphically in FIG. 7 where it can be seen that the rotation of the strander drum 54 per unit length of cable varies substantially linearly with respect to length of cable, and the direction of variation reverses periodically through the length of the cable 20 being stranded. The variation in direction occurs in intervals of approximately 150 feet of the cable length. The length of 150 feet is chosen because it is sufficiently small so that if a cable length does not correspond to an even multiple of 150 feet, there will not be a very significant variation in the length of the coaxial units 26—26 from the desired length that occurs with an average lay length of 36 inches. The length of 150 feet is sufficiently large that a repetition of any particular lay length, for example 36 inches, will occur only approximately six times during the stranding of a 1000 foot long cable 20 as compared to 300 times when a fixed lay length is used in the stranding of the cable.

Since it is important to provide the same length for the coaxial units 26—26 in the outer layer 22 as the coaxial units in the inner layer 24 by maintaining an average lay length of 36 inches, it becomes significant to realize that the relationship between "percentage takeup," or the percentage amount of excess length of the coaxial unit taken up by the unit traversing a spiral path about the cable 20, is not linearly related to the particular lay length with which the unit is being applied.

Figure 8:
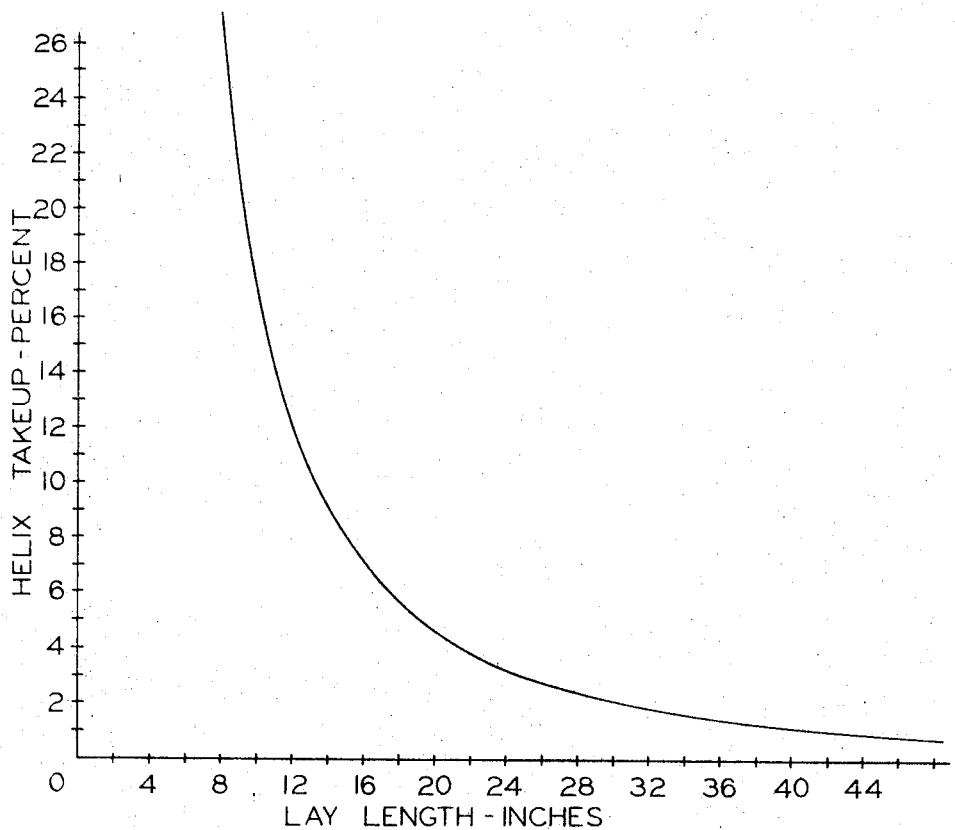
FIG. 8 is a graphical representation of the relationship between helix take-up in percent and lay length in inches for a layer of stranded elements having a mean diameter equivalent to the mean diameter of an outer layer of coaxial units produced by one embodiment of the invention herein.

The relationship between "percentage takeup" and lay length for the particular mean circumference of the outer layer 22 is illustrated in FIG. 8.

By referring to a graph like the one shown in FIG. 8, it is possible to establish arbitrarily a limit of maximum lay length, greater than 36 inches. A first area under the curve between 36 inches and the maximum lay length can be determined and a determination of the minimum lay length can be made by moving inwardly along the curve until an area equivalent to the first area is attained. When the two areas are equal the limits of lay variation will provide a cable 20 in which the coaxial units 26—26 have the same excess length or takeup as they would have if they were stranded with a 36 inch lay.

Of course, it is also possible to establish the limits of lay variation by choosing the lower limit first and determining the upper limit as described above.

Figure 9:
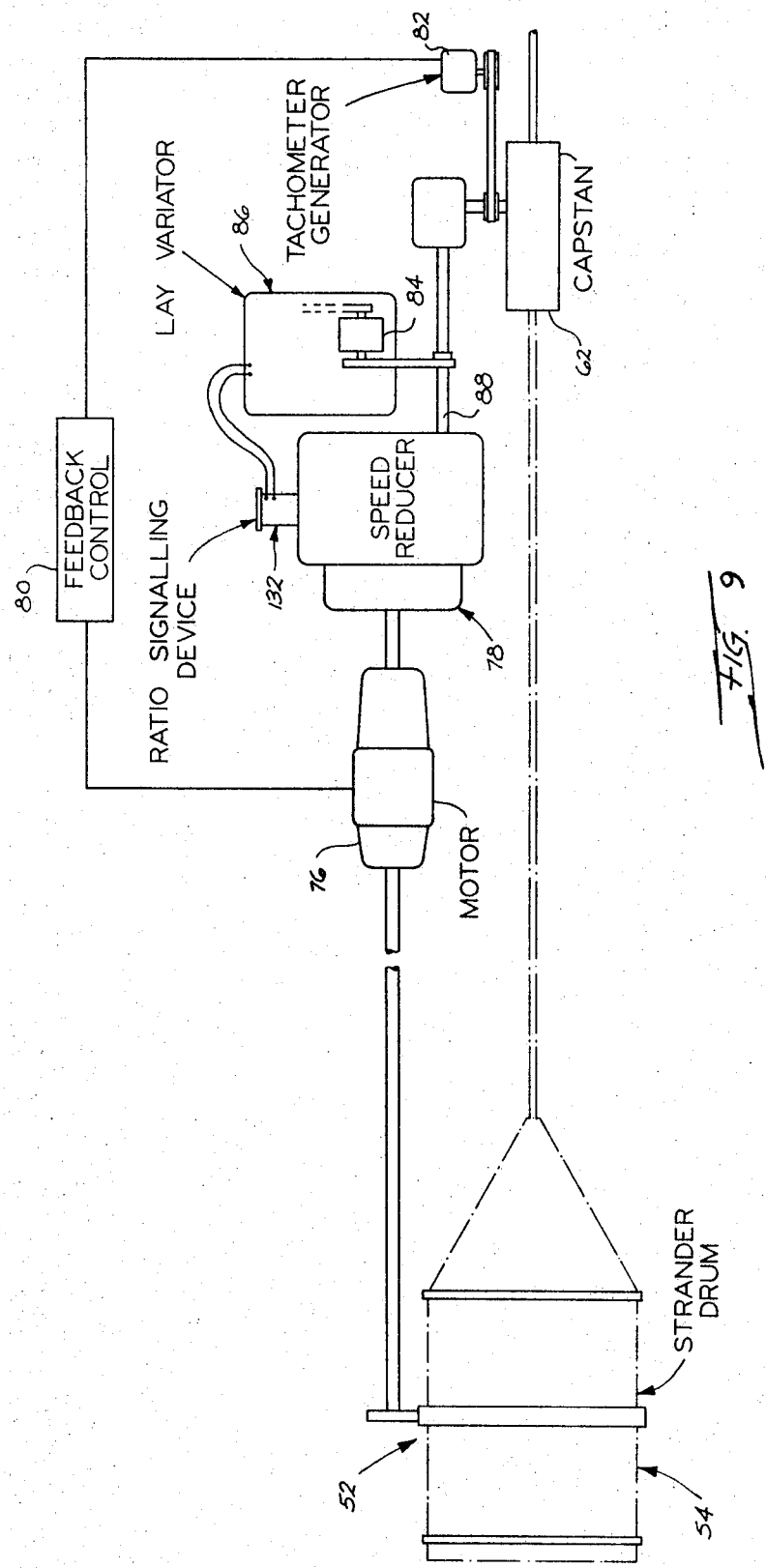
FIG. 9 is a schematic representation of a system which can be utilized to vary the lay length of a cable during the stranding thereof.

Referring now to FIG. 9, there is a schematic illustration of a system by which variation of lay length can be accomplished within the standing machine 52. The strander drum 54 is shown being driven through direct gearing by a motor 76. A variable-ratio speed reducer, designated generally by the numeral 78, is used in coupling the motor 76 to the capstan 62. Thus, by changing the ratio within the speed reducer 78, the rotative speed of the strander drum 54 can be varied with respect to the linear speed of the capstan 62. A feedback-control system 80 is used to sense a signal from a tachometer generator 82 to control the speed of the motor 76 so that the desired linear speed of the cable 20 is maintained during normal operation of the stranding operation. In order to vary the lay with the pattern shown in FIG. 7, a secondary, variable-ratio speed reducer, designated generally by the numeral 84, is used to drive a lay-variator device, designated generally by the numeral 86, which lay-variator device, in turn, changes the ratio of the variable-ratio speed reducer 78. The speed reducer 84 is driven from an output shaft 88 of the speed reducer 78. By setting a particular ratio within the speed reducer 84, one can establish the rate at which the lay of the outer layer 22 will vary as a function of the length of the cable 20.

Referring now to FIGS. 10 and 11, more detailed views of the lay variator 86 are shown. The speed reducer 84 is driven from the output shaft 88 of the speed reducer 78 with a conventional-timing belt 90. An input pulley 92 is mounted on an electromagnetic clutch 94, which can be disengaged so that the lay variator 86 can be taken out of the drive system of the standing machine 52 in order that the speed reducer 78 can be operated with a fixed ratio if desired.

An output pulley 95 of the speed reducer 84 is connected to a reversing mechanism pulley 96 by a timing belt 98. A shaft 100 is supported by conventional bearings 102—102, and a spur gear 104 is mounted on the opposite end of the shaft from the pulley 96. The spur gear 104 is meshed directly with another spur gear 106 which is mounted on a shaft 108. The shaft 108 is supported by two of the bearings 102—102.

The shaft 100 is provided with a clutch-pulley combination 110. The clutch-pulley combination 110 is an electromagnetic device which allows the pulley portion thereof to rotate with respect to the shaft 100 when the clutch portion thereof is not energized. An example of such a device is a Warner Electric clutch No. SF-250-1-2551 available from Warner Electric Brake and Clutch Company, Beliot, Wis. When the clutch portion of the clutch-pulley combination 110 is energized, the pulley portion thereof will rotate at the same speed as the shaft 100. A clutch-pulley combination 114, similar to the clutch-pulley combination 110, is mounted on the shaft 108. A timing belt 116 and a timing belt 118 are connected between the clutch-pulley combinations 110 and 114, respectively and a common pulley 120 which is mounted on a shaft 122 above the shafts 100 and 108. The shaft 122 is supported between two of the bearings 102—102, which are in turn mounted to brackets 124—124. Mounted at one end of the shaft 122 is a bevel gear 126 which meshes with another bevel gear 128 that is mounted on a ratio-adjustment shaft 130 for the speed reducer 78.

In operation, when it is desired to vary the lay of the outer layer 22 as it is being stranded, the clutch 94 is energized so that the speed reducer 84 is driven; and consequently, the shafts 100 and 108 are made to rotate. Because the shaft 108 is driven through the spur gears 104 and 106, the shaft 108 rotates in the opposite direction of the shaft 100. When the clutch-pulley combination 110 is energized, the clutch-pulley combination 114 is de-energized. Thus, the shaft 122 is made to rotate in the same direction of the shaft 100. When the clutch-pulley combination 110 is de-energized and the clutch-pulley combination 114 is energized, the shaft portion 122 is made to rotate in the opposite direction of the shaft 100. Thus, alternate energization and de-energization of the clutch-pulley combinations 110 and 114 result in reversal in direction of ratio change within the speed reducer 78.

Since the speed reducer 84 has a variable ratio, it is possible by changing the ratio within the speed reducer 84 to change the rate at which the ratio of the speed reducer 78 will change with respect to the length of the cable 20 which is being stranded.

Figure 12:
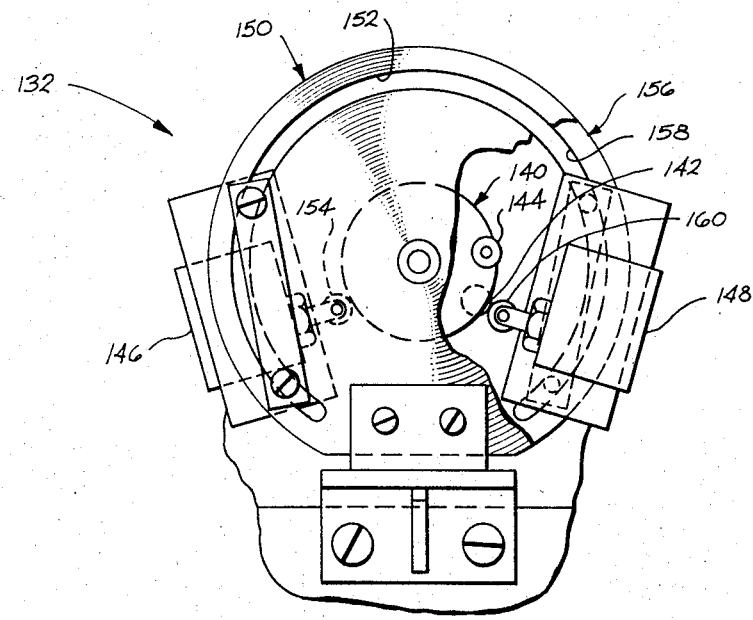
FIG. 12 is a front elevational view of the ratio signaling device of FIG. 9 having various portions thereof removed therefrom for purposes of clarity.
Figure 13:
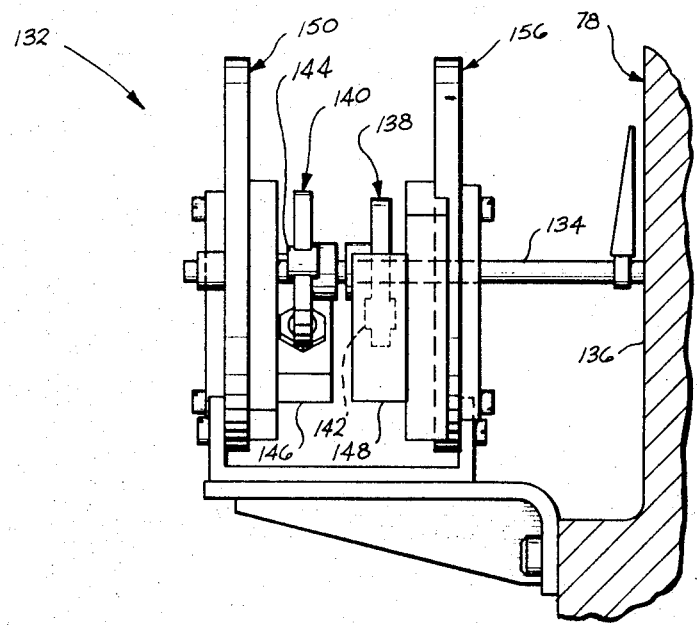
FIG. 13 is a side elevational view of the ratio signaling device of FIG. 12.

Referring back to FIG. 9, there is a ratio-signaling device, designated generally by a numeral 132, mounted on the speed reducer 78. The ratio-signaling device 132 can be understood in more detail by referring to FIGS. 12 and 13. An indicator shaft 134 is rotated in response to a variation in ratio of the speed reducer 78. The angular position of the indicator shaft 134 with respect to a case 136 of the speed reducer 78 is a function of the ratio at which the speed reducer is set. Cam plates, designated generally by the numerals 138 and 140, are mounted on the indicator shaft 134 for rotation therewith. The cam plates 138 and 140 have bosses 142 and 144 mounted thereon which are aligned with electrical switches 146 and 148, all respectively.

The switch 146 is mounted on a switch-mounting plate, designated generally by the numeral 150, which has an adjustment groove 152 cut therein. By moving the switch 146 to various positions around the adjustment groove 152, the angular position of switch actuation can be varied with respect to the case 136 of the speed reducer 78. Actuation of the switch 146, of course, occurs when the associated boss 142 comes into contact with and depresses a switch actuator 154. Actuation of the switch 146 will operate a control circuit, (not shown) which will energize the clutch-pulley combination 110 and de-energize the clutch-pulley combination 114 (FIGS. 10 and 11). The switch 148 is similarly mounted on a switch-mounting plate, designated generally by the numeral 156, which is provided with an adjustment groove 158; and the switch 148 is similarly actuated when the boss 144 comes into contact with and depresses a switch actuator 160. The actuation of the switch 148 has the opposite effect on the clutch-pulley combinations 110 and 114 as the actuation of the switch 146.

If the direction of variation of lay occurs at some regular interval such as 150 feet as used in the embodiment described herein, there is a possibility that some transmission loss might develop at a frequency with a half-wave length in the order of 150 feet or at frequencies which are higher order harmonics thereof. This secondary phenomenon, as one can call it, may become significant when numerous lengths of the cable 20 are combined together into a transmission system which may extend for thousands of miles. The suffering of a loss of transmission capability with a frequency associated with a half-wave length of 150 feet would probably not be significant to the use of the cable 20 as a transmission system because the frequency is outside the bandwidth of the cable. However, third, fourth or higher order harmonics of the frequency associated with a 150 feet half-wave length might very well be within the bandwidth of the cable 20.

Thus, it is desirable in making a cable 20 for a transmission system where the effect of the secondary phenomenon is important to use a technique for varying the lay in the cable wherein the generation of harmonics is held to a minimum.

Any secondary, periodic disturbance which occurs because of the use of a sinusoidal relationship between lay length and cable length will be limited to the fundamental frequency associated with the period of the sinusoidal variation. A purely sinusoidal variation in lay, per se, will have no harmonics associated with it.

A reduction, but not a complete elimination in generation of harmonics of the type described above, can be accomplished by reducing the sharpness or abruptness in reversals of direction of lay variation. An introduction of some curvature at the area of reversal will reduce the number of harmonics.

A reduction in the adversity of effects in the secondary periodicity might also be accomplished by varying the period of the reversals of the direction of lay change. For example, a cable might be made with its lay varying upwardly for 150 feet; then, downwardly for 100 feet; then, upwardly for 72 feet etc.

In reducing the adverse effects of the secondary phenomenon, it is important to remember that any departure from a simple linear shape with substantially instantaneous reversals leads to complications in choosing parameters which will result in a proper matching of electrical-delay time between the coaxial units 26—26 in the outer layer 22 and the coaxial units in the inner layer 24 of the cable 20.

Although a mechanical system utilizing the lay variator 86 has been described in the embodiment, it is possible to change the ratio of the variable-ratio speed reducer 78 by the use of a programmed motor (not shown), which can be controlled in direction and speed by a conventional-programming device (not shown), to accomplish the shaping of the relationship between cable lay and cable length into a sinusoidal or any other desired shape.

When the lay of the outer layer 22 is varied, the sharp spike at 155 to 157 mHz. on FIG. 4 is reduced so that the "SRL" pattern is as shown in FIG. 5. The spike at 172 to 173 mHz. which is associated with the repetitive discontinuity involved in the backtwist is also reduced when the lay of the outer layer 22 is varied. The reduction of the spike associated with backtwist occurs because the discontinuity associated with the backtwist has been varied in varying the lay of the outer layer 22.

A decrease in the size or even an elimination of the spike associated with backtwist can also be achieved by varying only the amount of backtwist as the cable 20 is being stranded. This variation in backtwist can be accomplished even if the stranding of the outer layer 22 is performed with a fixed lay. The variation in backtwist can be accomplished by driving the planetary yokes 58—58 with variable-rate drive systems (not shown) which can vary the amount of rotation of each of the planetary yokes with respect to the strander drum 54 as the strander drum is rotated about its axis. The technique of varying the backtwist can be useful if for some reason the variation of lay of the outer layer 22 is not practical or possible and an improvement of transmission capability at the associated frequency of the backtwist is important.

An alternate embodiment of the inventive cable 20 (not shown) may include a central, tubular conductor, such as one of the coaxial units 26—26, around which one or more additional conductors are applied with a lay. The additional conductors might include, for example, conventional twisted pairs of wire or other coaxial units. Varying the pattern with which the additional conductors are placed around the central tubular conductor can have a beneficial effect in reducing the introduction of periodic impedance discontinuities in central tubular conductors and the additional conductors.

The term "cable" as employed in the specification and the following claims, will be understood to refer to any form of multiple-conductor transmission media including those multiple-conductor transmission media known in the industry as "wire" or "cords."

The term "group" as used in the specification and the following claims is intended to include any series of impedance discontinuities which have equal spaces therebetween. It is intended that other impedance discontinuities with unequal spacing therebetween may exist between the discontinuities which are members of the group, but the discontinuities with unequal spacing are not to be considered members of the group.

Impedance discontinuities which are effective in producing peaks in return loss are those which are in groups wherein the spaces between adjacent discontinuities of the group are equal. Introduction of other impedance discontinuities within the same physical space that the group occupies will not necessarily have an effect on the peak return loss unless the other impedance discontinuities have some phase relationship with the discontinuities of the group. If there is some phase relationship between the discontinuities of the first-defined group and the other discontinuities, then there will exist another group incorporating these other discontinuities; and this group will, in turn, have an effect on peak return loss at some other frequency.

The term "pattern" as used in the specification and the following claims is intended to include a pattern generated by stranding some elements of a cable about other elements of the cable and a pattern generated by revolving individual elements about their own axes as the elements are combined into a cable.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of making an improved relatively high-frequency transmission cable having at least one conductive element which normally has a number of regularly occurring impedance discontinuities having intervals of length therebetween such that in-phase addition of reflections of energy associated with the discontinuities cause degradation of a transmission signal of a desired bandwidth of the associated conductive element, which comprises the steps of:
  combining a plurality of elongated elements, at least one of which is conductive, with each other in a variable pattern, and
  controlling the pattern by which the at least one conductive element is combined with the other elements of the cable so that the pattern varies along the length of the at least one conductive element while thereby simultaneously reducing the number of occurrences of impedance discontinuities which fall in the at least one group of discontinuities having intervals of length between successive discontinuities thereof which correspond to a half-wave length of a frequency which has its fundamental or harmonics in the desired bandwidth of the associated conductive element so that in-phase addition of reflections of energy associated with said group of discontinuities is reduced and any degradation of a transmitted signal caused by said group of discontinuities is decreased.

2. The method of claim 1, wherein the pattern is formed in the cable by imparting a backtwist to at least one of the elements during the combining therof.

3. The method of claim 2, wherein the backtwist is varied with a predetermined pattern with respect to the length of the cable.

4. The method of claim 2, wherein the backtwist is varied with a predetermined pattern with respect to the length of the element having the backtwist therein.

5. The method of claim 1, wherein at least one of the elements of the cable is an element having at least one tubular conductor.

6. The mehod of claim 1, wherein the cable formed has a plurality of elements each having at least one tubular conductor, which comprises the steps of:
  combining the elements having tubular conductors into at least two concentric layers, and
  controlling the effective electrical length of said elements so that the effective electrical lengths of said elements are substantially the same in all layers of said elements to reduce distortions of signals transmitted through a pair of said elements made of a first element from a first layer and a second element from another layer.

7. The method of claim 5, wherein a lay is imparted to at least one of any of the elements having a tubular conductor which varies sinusoidally along the length of the associated ones of any of said elements so formed.

8. The method of claim 1, wherein the pattern is formed in the cable by imparting a lay to at least one of the elements during the combining thereof.

9. The method of claim 8, wherein the lay is varied sinusoidally along the length of the cable.

10. The method of claim 5, which comprises the steps of:
  imparting backtwist in any of the elements of the cable having a tubular conductor, and
  varying the backtwist along the length of the cable.

11. The method of claim 8, wherein the lay is varied linearly along the length of the cable.

12. The method of claim 11, which comprises the step of alternating the direction of linear variation of the lay of the cable.

13. The method of claim 12, wherein the alternation of direction of linear variation is performed with a period of not greater than 300 feet of the cable length or less than 75 feet of the cable length.

14. The method of claim 12, wherein the alternation of direction of linear variation is performed with a period of not greater than 20% of the cable length or less than 5% of the cable length.

15. Apparatus for making an improved relatively high-frequency transmission cable having at least one conductive element which normally has a number of regularly occurring impedance discontinuities having intervals of length therebetween such that in-phase addition of reflections of energy associated with the discontinuities cause degradation of a transmission signal of a desired bandwidth of the associated conductive element, which comprises:
  means for combining a plurality of elongated elements, at least one of which is conductive, with each other in a variable pattern, and
  means for controlling the pattern by which the at least one conductive element is combined with the other elements of the cable so that the pattern varies along the length of the at least one conductive element while thereby simultaneously reducing the number of occurrences of impedance discontinuities which fall in the at least one group of discontinuities having intervals of length between successive discontinuities thereof which correspond to a half-wave length of a frequency which has its fundamental or harmonics in the desired bandwidth of the associated conductive element so that in-phase addition of reflections of energy associated with said group of discontinuities is reduced and any degradation of a transmitted signal caused by said group of discontinuities is decreased.

16. The apparatus of claim 15, wherein at least one of the elements of the cable is an element having at least one tubular conductor.

17. The apparatus of claim 16, which comprises:
  means for combining the elements having tubular conductors into at least two concentric layers, and
  means for controlling the effective electrical length of said elements so that the effective electrical lengths of said elements are substantially the same in all layers of said elements to reduce distortions of signals transmitted through a pair of said elements made of a first element from a first layer and a second element form another layer.

18. The apparatus of claim 16, which comprises means for imparting to at least one of any of the elements having a tubular conductor a lay which varies sinusoidally along the length of the associated ones of any of said elements so formed.

19. The apparatus of claim 15, which comprises means for imparting backtwist to at least one of the elements.

20. The apparatus of claim 19, which comprises means to vary the backtwist with a predetermined pattern with respect to the length of the cable.

21. The apparatus of claim 19, which comprises means to vary the backtwist with a predetermined pattern with respect to the length of the element having the backtwist therein.

22. The apparatus of claim 15, which comprises means for imparting a lay to at least one of the elements.

23. The apparatus of claim 16, which comprises:
  means to impart backtwist in any of the elements of the cable having a tubular conductor, and
  means to vary the backtwist along the length of the cable.

24. The apparatus of claim 22, which comprises means to vary the lay sinusoidally along the length of the cable.

25. The apparatus of claim 22, which comprises means to vary the lay linearly along the length of the cable.

26. The apparatus of claim 25, which comprises means to alternate the direction of linear variation of the lay along the cable.

27. The apparatus of claim 26, wherein the distance along the axis of the cable between which the direction of linear variation of the lay imparted to any of the elements of the cable is reversed lies within the range of 75 to 300 feet.

28. The apparatus of claim 26, wherein the distance along the axis of the cable between which the occurrence of the alternation of direction of linear variation of the lay imparted to any of the elements of the cable is between 5 and 20 percent of the cable length.

References Cited
UNITED STATES PATENTS

| | | | |
|---|---|---|---|
| 2,182,330 | 12/1939 | Windeler | 29—452 |
| 2,706,376 | 4/1955 | Kerr | 57—6 |
| 3,140,577 | 7/1964 | Ash | 57—93 XR |
| 3,187,495 | 6/1965 | Christian | 57—34 |

STANLEY N. GILREATH, Primary Examiner

W. H. SCHROEDER, Assistant Examiner

U.S. Cl. X.R.

57—34, 160; 174—34; 333—12